United States Patent [19]

Bicos

[11] Patent Number: 5,315,203
[45] Date of Patent: May 24, 1994

[54] APPARATUS FOR PASSIVE DAMPING OF A STRUCTURE

[75] Inventor: Andrew S. Bicos, Arcadia, Calif.

[73] Assignee: McDonnell Douglas Corporation, Long Beach, Calif.

[21] Appl. No.: 864,557

[22] Filed: Apr. 7, 1992

[51] Int. Cl.$^5$ .............................. H01L 41/08
[52] U.S. Cl. ........................ 310/326; 310/345
[58] Field of Search ............... 310/321, 322, 324, 325, 310/326, 327, 333, 345, 358, 316

[56] References Cited

U.S. PATENT DOCUMENTS

| Re. 24,191 | 7/1956  | Jaffe            | 310/358  |
|------------|---------|------------------|----------|
| 2,443,471  | 6/1948  | Mason            | 333/187  |
| 3,571,632  | 3/1971  | de Jong          | 310/326  |
| 3,794,866  | 2/1974  | McElroy et al.   | 310/327  |
| 4,047,060  | 9/1977  | Schaffer         | 310/322  |
| 4,083,433  | 4/1978  | Geohegan, Jr. et al. | 188/1 B |
| 4,249,421  | 2/1981  | Gaunaurd et al.  | 73/589   |
| 4,255,965  | 3/1981  | Schulz et al.    | 73/35    |
| 4,447,493  | 5/1984  | Driscoll et al.  | 428/332  |
| 4,528,652  | 7/1985  | Horner et al.    | 367/162  |
| 4,626,730  | 12/1986 | Hubbard, Jr.     | 310/326  |
| 4,630,072  | 12/1986 | Scardovi et al.  | 346/140 R|
| 4,633,982  | 1/1987  | Swigert          | 188/267  |
| 4,635,882  | 1/1987  | SenGupta et al.  | 244/119  |
| 4,654,554  | 3/1987  | Kishi            | 381/158  |
| 4,725,994  | 2/1988  | Kaneko et al.    | 367/140  |
| 4,795,123  | 1/1989  | For...d et al.   | 248/550  |
| 4,849,668  | 7/1989  | Crawley et al.   | 310/328  |
| 4,865,345  | 9/1989  | Piegay           | 280/682  |
| 4,883,248  | 11/1989 | Uchino et al.    | 248/550  |
| 4,958,100  | 9/1990  | Crawley et al.   | 310/328  |
| 5,032,753  | 7/1991  | Yamaguchi et al. | 310/317  |
| 5,108,802  | 4/1992  | Sattinger        | 428/34.1 |
| 5,142,511  | 8/1992  | Kanai et al.     | 367/164  |

Primary Examiner—Steven L. Stephan
Assistant Examiner—D. R. Haszko
Attorney, Agent, or Firm—Donald E. Stout; John P. Scholl

[57] ABSTRACT

An apparatus for controlling the motion of a structural member on a space platform truss structure, launch vehicle, automobile, building, or the like is comprised of a first driving piezoelectric element and a second constraining piezoelectric element. The first piezoelectric element is embedded in or bonded onto the structural member. The second piezoelectric element is bonded onto the structural member, with a viscoelastic material (VEM) layer sandwiched between the structural member and the second piezoelectric element. The first and second piezoelectric elements are electrically connected in opposite phase. When the structural member is deformed by an applied force, the first driving piezoelectric element is correspondingly deformed, generating an electrical field. The electrical field is then applied in an opposite sense to the second piezoelectric element through the electrical connections, thereby oppositely deforming the second piezoelectric element with respect to the first piezoelectric element. This opposite deformation induces a large shear strain in the VEM layer, giving the apparatus a large damping capacity. Because the system is passive, it has great advantages over prior art systems, because of its greater simplicity, lower cost, easier maintainability, and lower weight.

18 Claims, 2 Drawing Sheets

APPARATUS FOR PASSIVE DAMPING OF A STRUCTURE

BACKGROUND OF THE INVENTION

This invention relates to damping systems, and more particularly to a passive damping system using a combination of piezoelectric and viscoelastic elements.

Adding damping, or energy dissipation, has been and is a critical problem for many structures, including but not limited to large space platform truss structures, launch vehicle shrouds, automobile structures, and civil engineering structures. Traditionally, many structures have been treated with layers of viscoelastic materials (both constrained and unconstrained) to increase the overall damping of the structure. A viscoelastic material (VEM) is one which is viscous but which also exhibits certain elastic properties such as the ability to store energy of deformation. In such a material, the application of a stress gives rise to a strain that approaches its equilibrium value slowly. A classical traditional approach is to sandwich a layer of VEM between a structural member and a rigid constraining layer, the rigid constraining layer being more rigid than the VEM layer. When a force is applied to the structural member, from a vibration, a change in motion of the structure, or the like, the member deforms, with the portion of the VEM layer adjacent to the member deforming along with it. The purpose of the rigid constraining layer is to fix the portion of the VEM layer adjacent to it, thereby setting up an increased shear strain in the VEM layer. As a result, more energy is dissipated per cycle of vibration and damping of the vibration occurs more rapidly than would be the case without the constraining layer, thereby increasing the damping capacity of the system.

More recently, embedded piezoelectric ceramics with some associated electronics have been used to dissipate structural vibrations in beams. An example of this type of system is disclosed in U.S. Pat. No. 4,626,730. In that system a piezoelectric film is applied either directly to a structural member or atop an intermediate VEM layer. The structural member has on it a plurality of strain sensors, which are connected to a signal generator and amplifier circuit. The strain sensors, in turn, are connected to the piezoelectric film. In operation, when the strain sensors detect a deformation of the structural member, the signal generator is activated to signal the piezoelectric film. The voltage from the signal generator induces a strain in the piezoelectric film, which in turn induces distributed shearing displacement across the entire viscoelastic layer, thereby increasing damping capacity.

The problem with the above discussed systems is that the classical approach, employing a rigid constraining layer, often does not produce an adequate level of damping capacity. The second system, employing a piezoelectric film, requires a fully active circuit to obtain adequate damping response, adding a great deal of expense and complexity. What is needed, therefore, is a passive, simple, self-contained system which provides the level of damping response obtainable by an active system such as that discussed above.

SUMMARY OF THE INVENTION

This invention solves the problem outlined above by satisfying the need for a passive, simple, self-contained system for effectively countering forces applied to a structural member. The system provides a very high level of damping response or direct force resistance, depending upon how it is embodied. Basically, the apparatus comprises a plurality of piezoelectric elements which are integrated with the structural member and are electrically connected. This plurality of piezoelectric elements include a first driving piezoelectric element and a second piezoelectric element which is responsive to the output of the first piezoelectric element. The first and second piezoelectric elements are electrically connected in opposite phase. When the structural member is deformed by an applied force, the first driving piezoelectric element is correspondingly deformed, generating an electrical field. The electrical field is then applied in an opposite sense to the second piezoelectric element through the electrical connections, thereby oppositely deforming the second piezoelectric element with respect to the first piezoelectric element. This opposite deformation of the second piezoelectric element acts to more effectively control the motion of the structural member.

Several aspects of the inventive device are disclosed. In one preferred embodiment, a VEM layer is sandwiched between the structural member and the second piezoelectric element, so that the device acts as a damper. The second piezoelectric element should have a high enough modulus to serve as a relatively stiff constraining layer to the VEM layer. In this embodiment, when an oscillating force is applied to the structural member, the deformation of the first driving piezoelectric element will induce an opposite deformation of the second constraining piezoelectric element, as discussed above. This opposite deformation will in turn induce a large shear strain in the VEM layer, giving the apparatus a large damping capacity. The system has significant advantages over prior art systems, because the available damping capacity is similar to or greater than active systems in the prior art, yet the system is passive, resulting in much greater simplicity, lower cost, lower weight, and easier maintainability.

In another aspect of the invention, the second piezoelectric element is bonded directly onto the structural member. Thus, deformation of the second piezoelectric element in response to an applied force to the structural member causes the member to directly resist the applied force.

In yet another aspect of the invention, the first driving piezoelectric element may be either embedded in or bonded onto the structural member. Furthermore, there may be a plurality of first and second piezoelectric elements arranged in a number of different ways, as set forth in the description of the drawings.

The above mentioned and other aspects and features of this invention, and the manner of attaining them will become apparent, and the invention itself will be best understood, by reference to the following description taken in conjunction with the accompanying illustrative drawings.

DETAILED DESCRIPTION OF THE DRAWINGS

Figure 1:
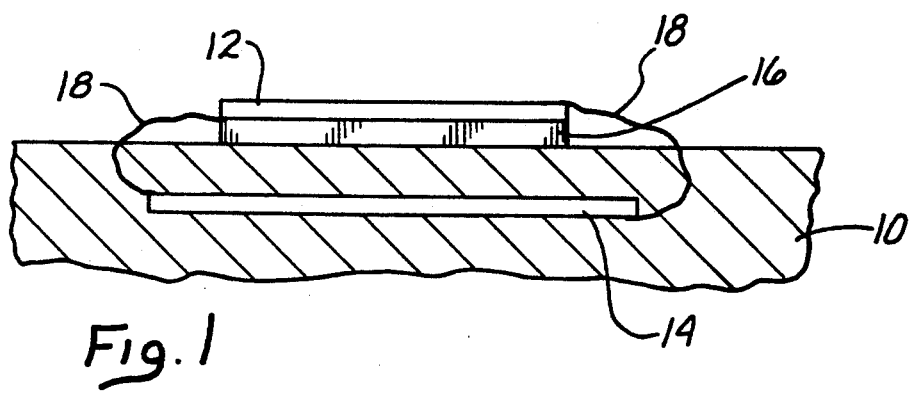
FIG. 1 is a cross-sectional view showing a structural member incorporating a first embodiment of the piezoelectric/viscoelastic damping system of the invention.

Referring now to the drawings, FIG. 1 shows a preferred passive damping system for a structural member 10, which includes a constraining piezoelectric element 12, an embedded piezoelectric element 14, and a viscoelastic material (VEM) layer 16 positioned between the piezoelectric element 12 and the structural member 10. Each piezoelectric element is electroded on its upper and lower surface. Piezoelectric elements 12 and 14 are electrically coupled by means of electrical connections 18, in an opposite phase relationship. Connectors 18 are preferably flat leads, because they are easier to embed, but may be any other known connector type. The structural member 10 may be employed in any type of structure, such as a space vehicle, building, ground vehicle, aircraft, machine, or the like. The VEM layer 16 may be formed of any known VEM, such as one or more layers of damping tape, for example. The piezoelectric element 12 must be of a material which has a high enough modulus to serve as a relatively stiff constraining layer to the VEM layer 16, and both of the piezoelectric elements 12 and 14 are preferably formed of a piezoelectric ceramic, such as Lead Zirconate Titanate (PZT).

Figure 2:
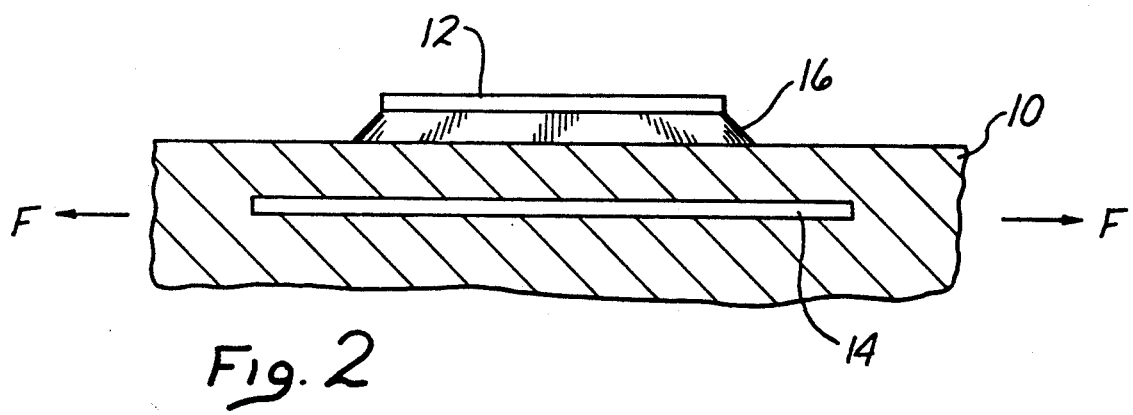
FIG. 2 is a cross-sectional view of the FIG. 1 embodiment, showing the structural member under load and the piezoelectric elements in an electrically unconnected state.
Figure 3:
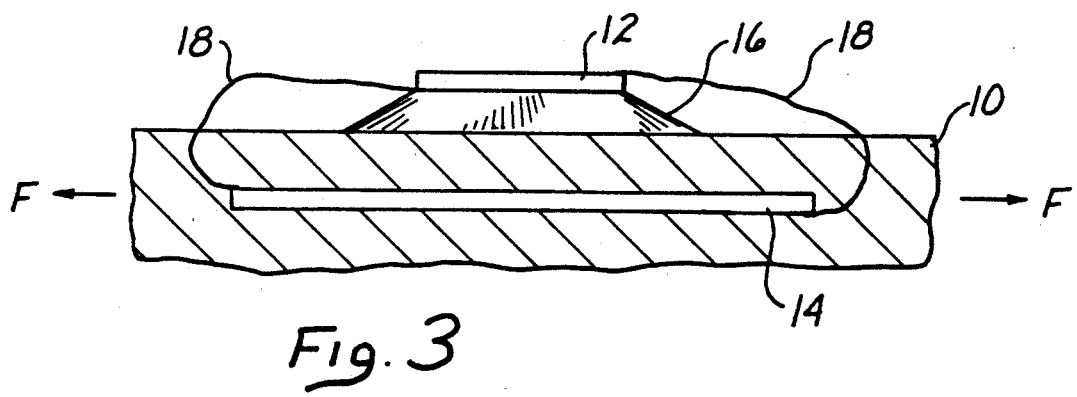
FIG. 3 is a cross-sectional view of the FIG. 1 embodiment, similar to FIG. 2, showing the structural member under load and the piezoelectric elements in an electrically connected state.

FIGS. 2 and 3 both show the embodiment of FIG. 1, with the structural member 10 under an oscillating load F which would be typical when the member is subjected to a vibration, a change in motion of the structure, or the like. When the load F is applied to the structural member 10, part of the load is applied to the piezoelectric element 14, which is embedded in the member 10. This causes the piezoelectric element 14 to deform by elongating, as shown in both of the FIGS. 2 and 3. This deformation of element 14 in turn causes an electric field to be generated in the material of element 14, because of its piezoelectric properties.

FIG. 2 represents the case in which the two piezoelectric elements 12 and 14 are not electrically connected. With no electrical connections between these two elements, the inventive device acts in much the same manner as in the classical damping approach discussed in the Background of the Invention portion of this specification, wherein a VEM layer is sandwiched between the structural member and a rigid constraining layer. As the structural member 10 deforms under load, the portion of the VEM layer 16 closet to the member 10 deforms as well. However, the portion of the VEM layer 16 closest to the rigid constraining element 12 is constrained from deforming. The result is that the shear strain in the VEM layer 16 is increased, thereby increasing damping capacity.

A remarkable increase in damping capacity is obtained by electrically connecting the two piezoelectric elements 12 and 14 by means of the electrical connections 18, as shown in FIG. 3. In this embodiment, when the embedded piezoelectric element 14 is elongated by force F, generating an electric field, this electric field is applied in an opposite sense through the connections 18 to the constraining piezoelectric element 12, such that element 12 deforms oppositely of element 14. In the figure, this opposite deformation results in the element 12 actually shrinking in length. Therefore, as the structural member 10 elongates under load, the portion of the VEM layer 16 closest to the member 10 elongates as well, as in FIG. 2. However, as the element 12 shrinks in length, the portion of the VEM layer 16 closest to piezoelectric element 12 shrinks along with it. Consequently, the shear strain energy in the VEM layer 16 is greatly increased with respect to the FIG. 2 (unconnected) embodiment. The result is that the damping capacity of the FIG. 3 system is significantly enhanced as compared with the FIG. 2 arrangement, without adding energy to the system.

The two piezoelectric elements 12 and 14 may be electrically modelled as two capacitors, $C_E$ and $C_C$, wherein E denotes "embedded" and C denotes "constraining". When the embedded piezoelectric element 14 is strained due to structural vibration, a voltage is generated and appears at the constraining layer 12. Once the voltage across the piezoelectric elements is determined, the constraining layer 12 and the VEM 16 then act approximately like a surface-bonded actuator with finite bonding layer. Testing results indicated that more than 50 percent more damping can be obtained when the piezoelectric elements 12, 14 are electrically connected (FIG. 3) than when they are unconnected (FIG. 2).

Although an exemplary embodiment of the invention has been shown and described, many changes, modifications, and substitutions may be made by one having ordinary skill in the art without departing from the spirit and scope of the invention. For example, although a passive damping system such as that disclosed is preferred, it would be possible to make it a partially active system by employing an amplifier circuit to enhance the potential difference between the piezoelectric elements 12 and 14, thereby increasing the relative deformation thereof. It would also be possible to make the system fully active by employing an amplifier circuit in conjunction with using the piezoelectric element 14 as a sensor to measure the deformation of the structural member 10 due to a vibrational force. The sensor would then activate the amplifier circuit to actively initiate a deformation of the constraining piezoelectric element 12.

The amount of additional shear strain energy that has been developed within the VEM layer 16 is related to the amount of strain induced in the piezoelectric element 12 by the electric field generated by the strained piezoelectric element 14. The larger the ratio of strain in the piezoelectric element 12 to that in piezoelectric element 14, the larger the additional VEM shear strain energy and hence the larger the additional damping capacity.

The strain developed in piezoelectric element 12 is related to the ratio of the electrical capacitance of the piezoelectric element 14 to that of the piezoelectric element 12. The capacitance of a piezoelectric plate-like element is proportional to its electroded surface area. Thus, by making the area ratio of the piezoelectric element 14 to that of the piezoelectric element 12 as large as possible the induced strain on the piezoelectric element 12 will be maximized, thereby maximizing the additional damping capacity. The additional damping capacity is also a function of the thickness ratio of the piezoelectric element 14 to that of the piezoelectric element 12 such that the larger this thickness ratio is, the higher the resultant damping capacity. Consequently, it is desirable to use thicker embedded piezoelectric elements 14 and thinner constraining layer piezoelectric elements 12 and it will often be advantageous to utilize a plurality of smaller area embedded piezoelectric elements 14 rather than a larger single one, because of the difficulty of working with and embedding a larger piece of piezoelectric material.

If the desired result were to resist motion of the member 10 rather than to damp the motion, one could glue the constraining layer directly to the structural member 10, without employing a VEM layer at all. Also, for bending motions, a more effective embodiment would be one wherein a damping system of the invention were mounted on each side of the structural member 10, relatively near the surface where the greatest stresses are.

Figure 4:
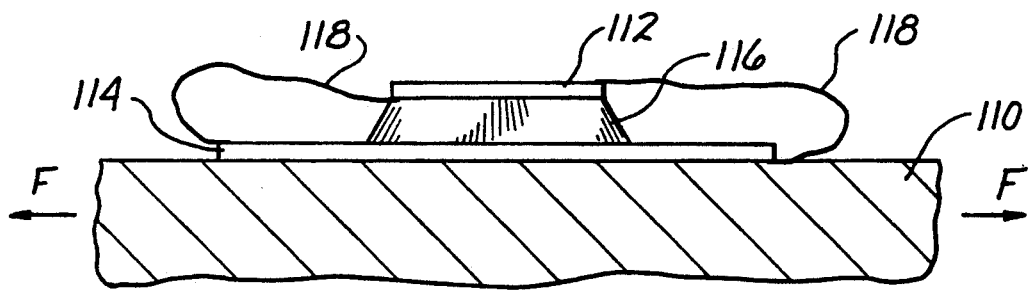
FIG. 4 is a cross-sectional view, similar to FIG. 3, of a second embodiment of the invention.

FIGS. 4–7 depict four alternative embodiments to that of FIG. 3, which are identical in all respects to that of FIG. 3 except as described and shown herein. Each of the elements in FIGS. 4–7 corresponding to equivalent elements in FIGS. 1–3 are designated by the same reference numeral, preceded by either a 1, 2, 3, or 4. Referring now to FIG. 4, there is shown a modification wherein a piezoelectric element 114 is bonded onto a structural member 110, rather than being embedded in it, as in the FIG. 3 embodiment. A VEM layer 116 is sandwiched between the piezoelectric element 114 and a constraining piezoelectric element 112, such that the device forms one unified part which is bonded securely to the structural element 110. Piezoelectric elements 112 and 114 are electrically connected, as shown, by means of connections 118.

Figure 5:
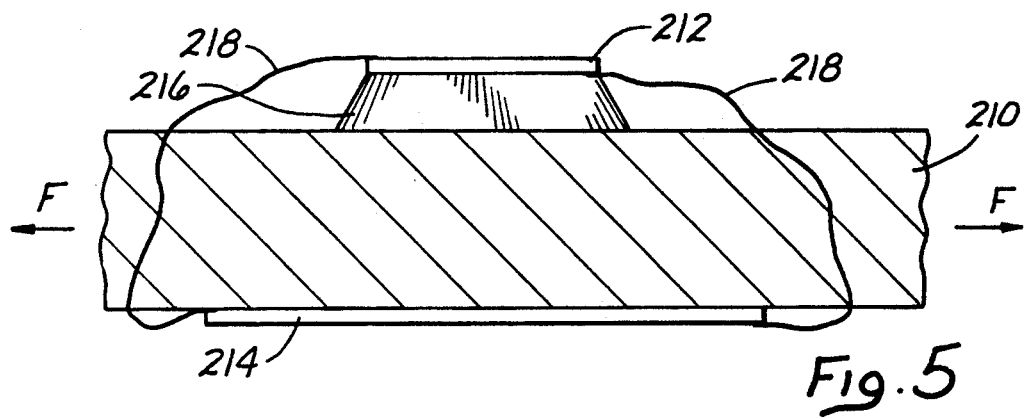
FIG. 5 is a cross-sectional view, similar to FIG. 3, of a third embodiment of the invention.

A variation of the FIG. 4 embodiment is shown in FIG. 5, wherein a piezoelectric element 214 is bonded to a structural element 210 at some other location, such as on the opposite side of the structural element 210 with respect to a constraining piezoelectric element 212. Again, in this embodiment the piezoelectric elements are electrically connected, in opposite phase, by means of connections 218.

Figure 6:
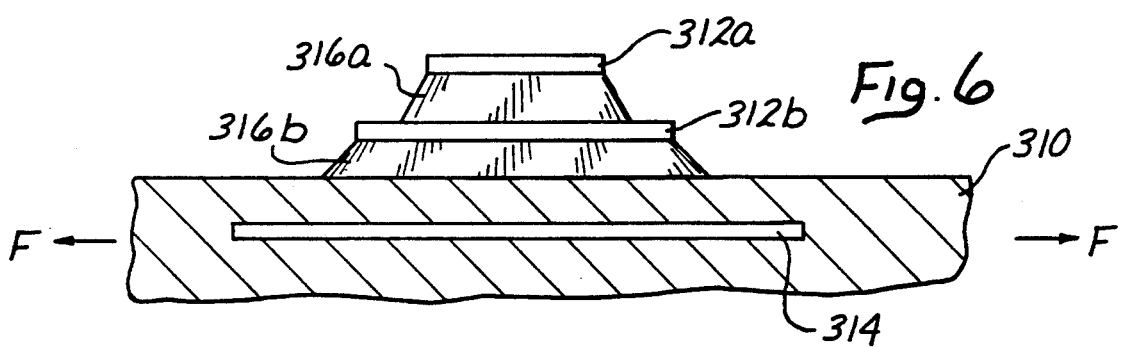
FIG. 6 is a cross-sectional view, similar to FIG. 3, of a fourth embodiment of the invention.
Figure 7:
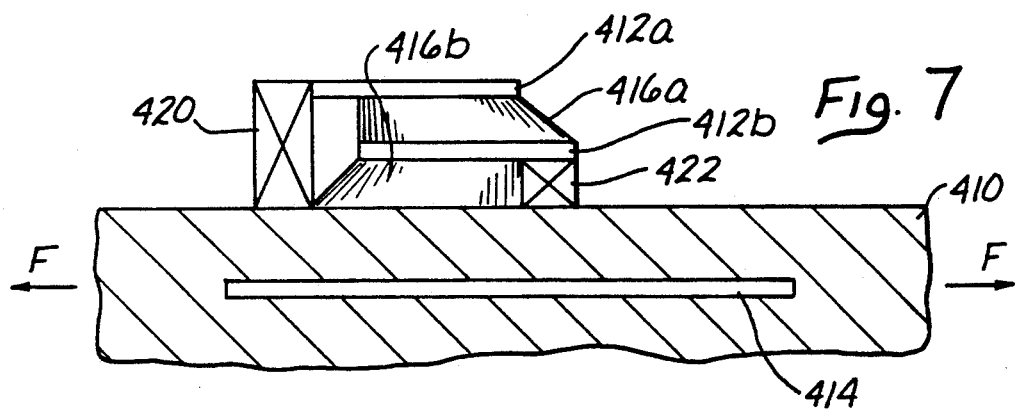
FIG. 7 is a cross-sectional view, similar to FIG. 3, of a fifth embodiment of the invention.

The versatility of the inventive device is such that it can also be used in concepts that are variations of the classical constrained layer treatments, such as unanchored and anchored multiple layers, where the difference is that the constraining layers in the classical treatment are replaced with a piezoelectric element, as discussed above. Any classical concept employing a constraining layer or layers can be enhanced by the application of this invention. FIGS. 6 and 7 shown two representative embodiments. In FIG. 6, unanchored multiple layers are employed, with a first constraining piezoelectric element 312a, a second constraining piezoelectric element 312b, and first and second VEM layers 316a and 316b, respectively. In FIG. 7, anchored multiple layers are employed, with a first constraining piezoelectric element 412a being anchored to a structural member 410 by a first anchoring means 420 and a second constraining piezoelectric element 412b being anchored to the structural member 410 by a first anchoring means 422. The piezoelectric elements 312a, 312b, and 314 in FIG. 6 and 412a, 412b, and 414 in FIG. 7 are all electrically connected in the same manner as in the FIG. 3 embodiment, though the connections are not shown for the sake of clarity.

Any of the above discussed modifications possible with respect to the FIG. 3 embodiment are also possible with respect to the FIGS. 4–7 embodiments.

In view of the many possible embodiments for utilizing the inventive technology, the scope of the invention is to be limited only in accordance with the following claims.

I claim:

1. An apparatus for controlling the motion of a structural member, comprising a plurality of piezoelectric elements which are physically integrated with said structural member, each of said plurality of piezoelectric elements being electrically connected to another of said piezoelectric elements, said plurality of piezoelectric elements including a driving first piezoelectric element and a constraining second piezoelectric element, said apparatus further including a layer comprised of viscoelastic material which is sandwiched between said structural member and said second piezoelectric element, wherein said second piezoelectric element has a high enough modulus to serve as a substantially stiff constraining layer to the viscoelastic material layer.

2. The apparatus as recited in claim 1, wherein said apparatus comprises a passive electrical circuit.

3. The apparatus as recited in claim 1, wherein there are a plurality of said constraining second piezoelectric elements and a plurality of said viscoelastic material layers.

4. The apparatus as recited in claim 3, wherein a plurality of anchoring devices anchor each of said plurality of constraining second piezoelectric elements to said structural member.

5. The apparatus as recited in claim 1, wherein said second piezoelectric element comprises a piezoceramic material.

6. The apparatus as recited in claim 5, wherein said second piezoelectric element comprises Lead Zirconate Titanate.

7. The apparatus as recited in claim 1, wherein said first piezoelectric element is embedded in said structural member.

8. An apparatus for controlling the motion of a structural member, comprising a plurality of piezoelectric elements which are physically integrated with said structural member, each of said plurality of piezoelectric elements being electrically connected to another of said piezoelectric elements and including a driving first piezoelectric element and a constraining second piezoelectric element, wherein said first and second piezoelectric elements are electrically connected in opposite phase, such that when said structural member is deformed by an applied force, said first piezoelectric element is correspondingly deformed, thereby generating an electrical field which is applied in an opposite sense to said second piezoelectric element through the electrical connections, oppositely deforming the second piezoelectric element with respect to the first piezoelectric element, the opposite deformation of the second piezoelectric element acting to effectively control the motion of the structural member.

9. The apparatus as recited in claim 8, wherein a viscoelastic material layer is sandwiched between said structural member and said second piezoelectric element.

10. The apparatus as recited in claim 8, wherein said second piezoelectric element has a high enough modulus to serve as a substantially stiff constraining layer to the viscoelastic material layer.

11. The apparatus as recited in claim 8, wherein said second piezoelectric element is bonded directly to said structural member, such that deformation of said second piezoelectric element in response to an applied force to the structural member causes the member to directly resist the applied force.

12. The apparatus as recited in claim 8, wherein there are a plurality of said driving first piezoelectric elements.

13. An apparatus for damping forces applied to a structural member, comprising:
   a first piezoelectric element integrated with said structural member;
   a second piezoelectric element mounted on said structural member;
   a viscoelastic layer sandwiched between said structural member and said second piezoelectric element, said second piezoelectric element having a high enough modulus to serve as a substantially stiff constraining layer to the VEM layer;
   said first and second piezoelectric elements being electrically connected in opposite phase, whereby when said structural member is deformed by an applied force, said first piezoelectric member is correspondingly deformed, thereby generating an electric field, said electric field being applied in an opposite sense to said constraining second piezoelectric element, oppositely deforming said constraining second piezoelectric element and inducing a large shear strain in said VEM layer.

14. The apparatus as recited in claim 13, wherein said second piezoelectric element comprises a piezoceramic material.

15. The apparatus as recited in claim 14, wherein said second piezoelectric element comprises Lead Zirconate Titanate.

16. The apparatus as recited in claim 13, wherein said first piezoelectric element is embedded into the structural member.

17. The apparatus as recited in claim 13, wherein said first piezoelectric element is bonded onto the structural member.

18. The apparatus as recited in claim 17, wherein the viscoelastic material layer is sandwiched between said first and second piezoelectric elements, thereby forming a unitary damping device.

* * * * *